United States Patent [19]
Hawkins

[11] 3,870,815
[45] Mar. 11, 1975

[54] CONDUCTOR VIBRATION DAMPING DEVICE

[75] Inventor: Ronald G. Hawkins, Massena, N.Y.

[73] Assignee: Aluminum Company of America, Pittsburgh, Pa.

[22] Filed: Feb. 21, 1974

[21] Appl. No.: 444,322

[52] U.S. Cl. .................. 174/42, 174/146, 188/1 B
[51] Int. Cl. ........................ H02g 7/12, H02g 7/14
[58] Field of Search .............. 174/42, 146; 188/1 B; 267/136

[56] References Cited
UNITED STATES PATENTS
| | | | |
|---|---|---|---|
| 3,291,892 | 12/1966 | Bethea, Jr. | 174/42 |
| 3,617,609 | 11/1971 | Tuttle | 174/42 |

FOREIGN PATENTS OR APPLICATIONS
| | | | |
|---|---|---|---|
| 1,084,102 | 9/1967 | Great Britain | 174/146 |

*Primary Examiner*—Laramie E. Askin
*Attorney, Agent, or Firm*—Elroy Strickland

[57] ABSTRACT

A device for spacing conductors and for damping mechanical vibrations of a conductor, the device including a conductor clamping member mechanically connected to an adjacent member, such as another conductor clamping member, by a close wound helical spring and a pin means spaced from the spring, the spring and pin means extending between spaced arms of one of the members and through a single arm of the other member located between and spaced from the spaced arms of the one member.

6 Claims, 7 Drawing Figures

3,870,815
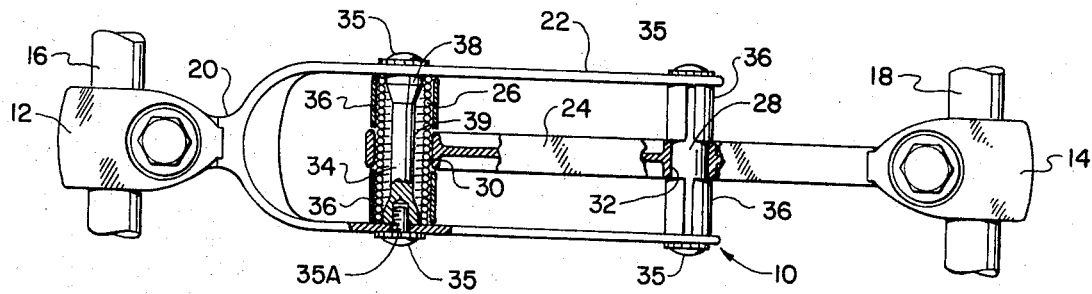
Fig. 1
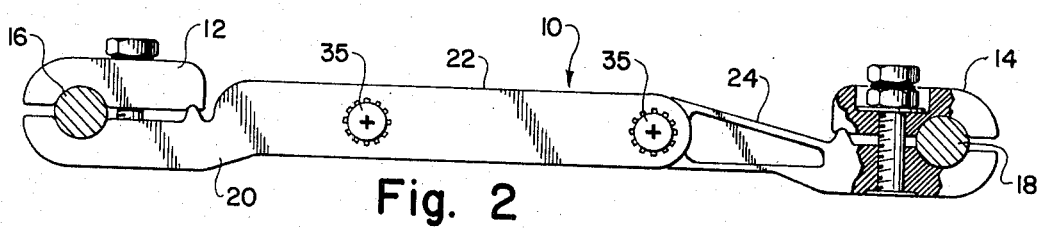
Fig. 2
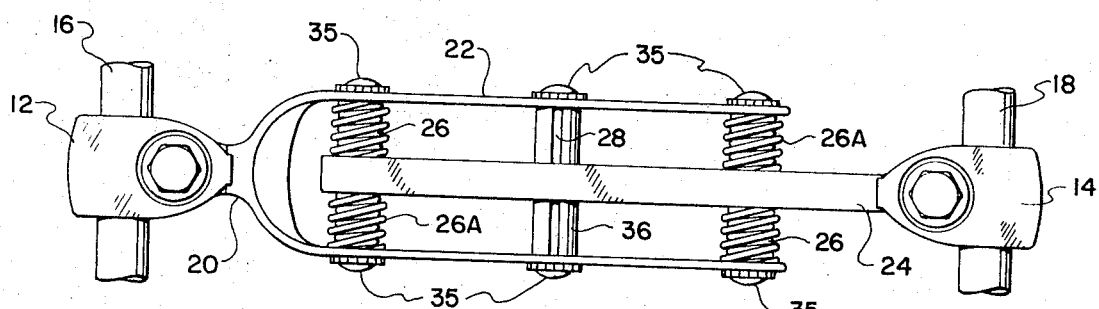
Fig. 3
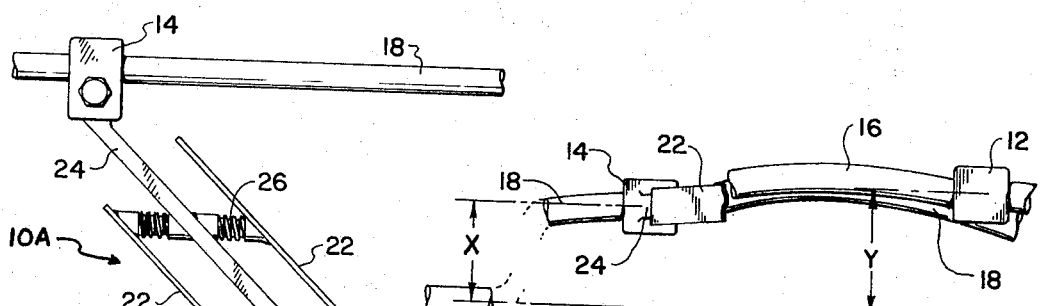
Fig. 4
Fig. 5

CONDUCTOR VIBRATION DAMPING DEVICE

BACKGROUND OF THE INVENTION

The present invention relates generally to a conductor vibration damping and spacing device in which a pin or bolt means supports the suspended weight of the device, and a close wound, helical spring is effective to damp vibrations of a conductor.

In U.S. Pat. No. 3,617,609 issued in the name of Paul D. Tuttle on Nov. 2, 1971 there is disclosed a conducting vibration damping and spacing device in which two close wound helical springs mechanically and resiliently connect together conductor clamping members in such a manner that the coils of at least one of the springs, when the device is connected between parallel subconductors of a conductor bundle, will be translated crosswise the springs's longitudinal axis in response to the motion or vibration of at least one of the subconductors. Damping of the subconductor vibration is effected by the friction between the translated, closed coils of the spring (or springs), the friction dissipating the energy of the vibration in the form of heat. The springs are held in place by pin or bolt means extending through the arms of the conductor clamps and through the centers of the springs.

In the device of the Tuttle patent, the weight of the device, which weight includes a frame, springs (both open and close wound) and bolts, suspended between the subconductors is supported only by the close wound springs. For this reason, the strength of the springs, i.e., the size of the springs and the diameter of the spring wire, must be such that the springs support the suspended weight of the device without substantial deformation of the springs. Under the suspended weight of the device, if the springs are not of sufficient size and strength, the springs deform to the extent the coils of the springs adjacent the longitudinal center thereof are brought close to and even into contact with the lower surface of the pin or bolt means extending through the center of each spring. With the spring in contact with the lower surface of the pin, the spring is not free to be translated in an upward direction in response to the vibration of an associated conductor (subconductor) to dissipate the energy of the vibration, i.e., the spring can only move in essentially one, downward direction away from the center pin to effect damping. As indicated above, this can be corrected by using close wound springs of a sufficient size and strength, which size and strength adds cost to each of the devices made.

SUMMARY OF THE INVENTION

The present invention is directed to a conductor spacing and damping device in which the suspended weight thereof is solidly supported by a rigid pin or bolt means, with the damping being accomplished by one or more close wound, helical springs spaced from the pin means. The pin means provides a rigid pivot point or location about which a conductor clamp is translated with the vibratory motion of the conductor or subconductor to which the clamp is attached.

By virtue of the fact that the suspended weight of the present damping device is supported by the pin means, and not by the damping spring or springs, the spring or springs can be of a size and can be made from spring stock substantially smaller than that required for the above-discussed Tuttle damping device without tending to deform. With little or no deformation of the spring the coils thereof are free to move in any direction, about a pin extending through the center of the damping spring, in response to the motion of a conductor clamp and its associated conductor. Since the close wound spring of the present invention is relatively small in size, it is less costly than larger springs thereby providing a more economical spacer-damper device over a device requiring larger springs.

THE DRAWINGS

The invention, with its advantages and objectives, will be better understood from consideration of the following detailed description and the accompanying drawings in which:

FIG. 1 is a plan view of a two conductor bundle spacer and damper embodiment of the invention, with a damping spring portion thereof being shown in vertical section;

FIG. 2 is a side elevational view of the embodiment of FIG. 1;

FIG. 3 is a schematic represetnation of a modification of the embodiment of FIGS. 1 and 2;

FIG. 4 is a plan view of yet another embodiment of FIGS. 1 and 2;

FIG. 5 is a partial view of the structure of FIG. 4 showing in-phase, standing wave loops in the conductors of FIG. 4;

PREFERRED EMBODIMENTS

Figure 6:
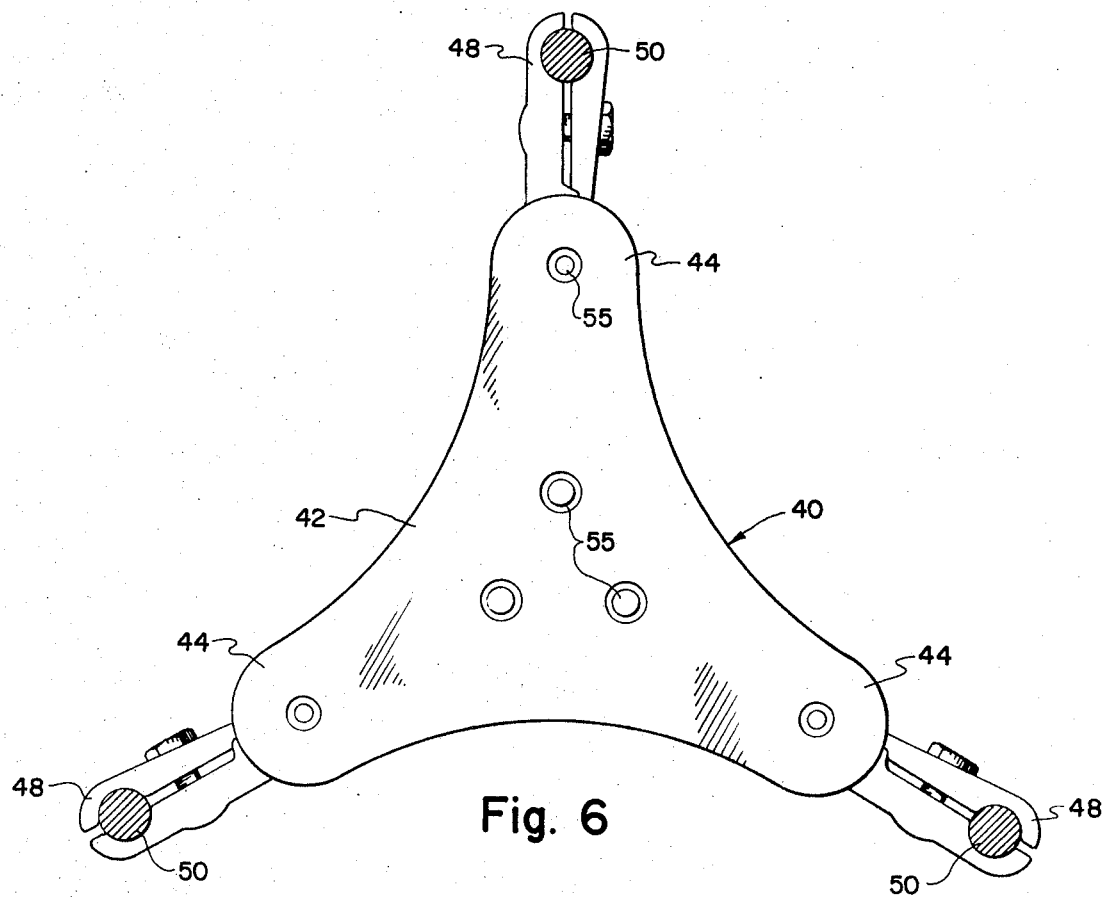
FIG. 6 is a side elevational view of a three subconductor bundle spacer and damper embodiment of the invention.

Referring now to FIGS. 1 and 2 of the drawings, numeral 10 designates generally a conductor spacer and vibration damping device of the invention, the device 10, as best seen in FIG. 1, having two clamps 12 and 14 clamped respectively to two parallel conductors or subconductors 16 and 18, one of the clamps having an integral and relatively short arm portion 20 that is bifurcated to provide two parallel, elongated arms 22 extending rearwardly of the clamp, while the other clamp has a single, integral, elongated arm 24 extending rearwardly therefrom. The single arm 24 of one clamp is located between and spaced from the double arms of the other clamp, the clamps being mechanically connected together at two spaced apart locations along the lengths of their arms by a close wound, helical spring 26 (shown in vertical section in FIG. 1) and a rigid pin 28, the spring and pin extending between the double (outside) arms of the one clamp and through respective openings 30 and 32 provided in the single arm of the other clamp. The axes of the spring and pin, of course, extend through arms of the clamps.

A second pin 34 is employed to secure spring 26 in place between the clamp arms 22, pin 34 itself extending between clamp arm 22 and through the axial center of the spring, pin 34 being visible in FIG. 1 by virtue of the vertical section of spring 26 depicted in FIG. 1. Both pins 28 and 34 are shown secured in place by relatively short screws or bolts 35 extending through openings 35A (only one of which is shown in FIG. 1) provided in arms 22 of the one clamp and threaded into the opposed ends of the pins aligned with such openings.

The single arm 24 of the clamp 14 is shown (FIG. 1) maintained in the center of the spaced arms 22 by four split sleeves 36 located respectively around the spring 26 and pin 28, and between the clamp arms, though other means, such as open coil springs (FIG. 7), can be used in the manner of the sleeves.

The shank of the pin 34 that secures the spring 26 has a cylindrical ledge 38 at each end thereof, the diameter of each ledge corresponding closely to that of the internal diameter of spring 26. Such ledges center the spring about a reduced diameter portion 39 of the pin shank between the ledges, and thus in the area of the center arm 24 of conductor clamp 14.

The weight of the device 10, as thus far described, is supported in part by the conductors 16 and 18 to which the clamps 12 and 14 are attached. However, the clamps and their arms, unless mounted and maintained in a vertical position, have weight moments existing about the longitudinal axes of their respective conductors, which, in combination with the mass and weight of the pins 28 and 34, spring 26, pin fasteners 35 and sleeves 36, have to be supported between the conductors. In the present invention, the weight of the device suspended between the conductors is solidly supported by the rigid pin 28, thereby leaving the center coils of spring 26 free for movement in response to conductor vibration in a manner presently to be explained.

In the operation of the device 10, with the clamps 12 and 14 clamped to two corresponding conductors 16 and 18, such that the device extends and is suspended between conductors 16 and 18, any motion or vibration of one or both of the conductors is constrained to an arc transcribed about the axis of the pin 28 such that the corresponding clamp and clamp arm rotate about pin 28. If clamp 12, for example, is translated about the axis of pin 28 by virtue of wind induced oscillation of conductor 16, the arms 22 of the clamp tend to translate the pin 34, and thus the coils of the spring 26 located on the ledges 38 of the pin, about the end of arm 24 (of clamp 14) engaging the center coils of the spring thereby causing relative, sliding movement of the coils of the spring intermediate the ends thereof. Such sliding, relative movement of the spring coils creates friction between adjacent coils, which friction is effective to damp the conductor oscillation by dissipating the energy thereof in the form of heat. Since pin 34 has a reduced diameter portion 39 intermediate the end ledges 38, and since the pin 28 carries the suspended weight of the device 10, as explained above, before conductor motion begins, the coils of the spring along the reduced diameter portion of the pin are spaced from the reduced diameter portion, and are thus free to move in any direction crosswise the longitudinal axis of the spring about pin 28 in response to conductor motion and that of the associated conductor clamps. Since pin 28 supports the weight of the device 10, the size and strength of spring 26 can be smaller, as discussed above, and thus more economical, than what would be required if the weight of the device was supported by a damping spring or springs.

The device of FIGS. 1 and 2 is a simple, inexpensive yet effective spacer-damper employing only a single damping spring. An additional damping spring or springs, however, can be inexpensively added to the device by simply disposing such an additional spring along the length of the clamp arms 22 and 24 spaced from the pivot pin 28 by appropriate distances. In the schematic representation of FIG. 3, springs 26 and 26A are shown located on opposite sides of the pivot pin, though the springs may be both located to one side of the pin in either direction.

Yet another embodiment of the invention is shown in the plan view of FIG. 4, which figure shows conductor clamps 12 and 14 of a damping spacer 10A laterally offset from each other for the purpose of providing more effective damping of aeolian vibrations. A steadily flowing wind moving crosswise of two suspended, parallel conductors, in which the conductors have the same diameter, weight (pounds per foot) and tension, causing standing waves (aeolian vibrations) to develop in both conductors. The frequency, and thus the loop length of the vibration, and the phase or location of the loop in each conductor are substantially the same as indicated in the view of FIG. 5. With two clamps of a damping spacer connected to the respective conductors at substantially the same distance from the tower supporting the conductors, the clamps move together with the in-phase loops of the vibrating conductors so that no relative displacement of the clamps takes place to effect relative movement of the coils of the damping spring to provide damping action. By laterally offsetting the clamps 12 and 14, as shown in FIG. 4, the clamps are located at unequal distances from the tower. With aeolian vibrations of the conductor, the clamps are now at different locations on the two loops of the standing waves (as shown in FIG. 5) to provide the needed relative movement of the clamps for damping. The relative displacement provided by the offset of the clamps is indicated in FIG. 5 by arrow lines $x$ and $y$.

Figure 7:
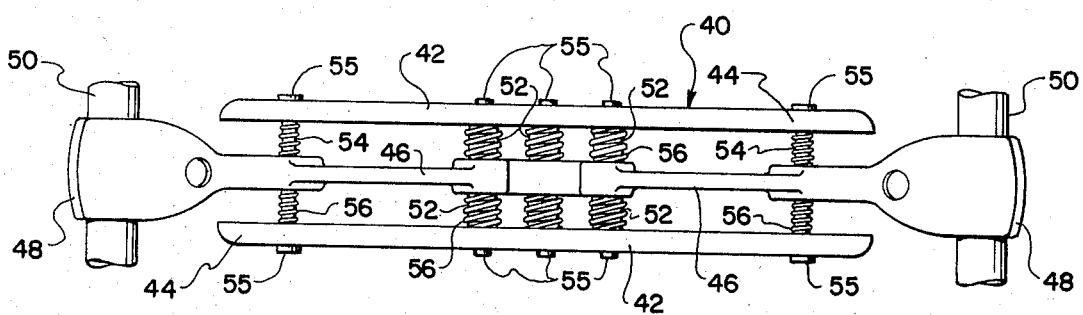
FIG. 7 is a top view of the embodiment of FIG. 6.

FIGS. 6 and 7 of the drawings show an embodiment of the invention in which a frame member is employed to connect together three conductor clamps and their respective subconductors in a damping and spacing manner. More particularly, in FIG. 6, a frame member 40 is shown having an essentially Y configuration in elevation, the Y configuration being necessitated by the general disposition of the subconductors in a three conductor bundle arrangement. If the frame type of structure of the invention is employed to space two, four or more subconductors of a conductor bundle, then the configuration of the frame member would, of course, vary in accordance with the configuration of the bundle.

Referring particularly to frame member 40 as it appears in FIG. 6, the frame member is comprised of two, spaced, parallel plate portions 42 (FIG. 7) providing three outwardly extending parallel arm portions 44 spaced apart to receive respectively three integral arms 46 of three conductor clamps 48 shown respectively attached to three parallel conductors 50. Each conductor arm and respective parallel arm portions of the frame are mechanically connected together by a rigid pin means 54 located near the outward extremity of the frame arm and near the portion of conductor clamp attached to the conductor, and a close wound, helical spring 52 located adjacent the center of the frame, and near the rearwardly extending end of the clamp arm. Like the structures of FIGS. 1 to 5, the pin means and springs, and their longitudinal axes, extend through openings provided in the clamp arms, and a second pin means (not visible in FIGS. 6 and 7) having a reduced diameter shank portion between the ends thereof, secures each close wound spring 52 in place. Similarly, the second pin means, like that of pin means 54, is secured to the frame arms by screw or bolt means 55 threaded into the ends of the pin means.

AS shown in FIG. 6 of the drawings, the arms of the conductor clamps are resiliently maintained in a center position between the spaced arms and plate portions of the frame 40 by open coil springs 56 located around the pins and close coil springs between the arms of the frame and clamps. Alternatively, cylinders may be used to center the clamp arms, as shown in FIG. 1.

The operation of the device of FIGS. 6 and 7 is similar to that of FIGS. 1 and 2, namely, the rigid pins 54 support the suspended weight of the device thereby leaving the close wound springs 52 unloaded for immediate response to conductor movement and vibration about the locus of one or more of the pins 54, the spring or springs responding by allowing relative movement of the coils thereof which provides intercoil friction to dissipate the energy of the conductor motion or vibration in the form of heat. As in the case with the structure of FIGS. 1 and 2, such damping phenomenon is effected with relatively small, inexpensive springs in comparison to what would be required if the damping springs had to support the suspended weight of the device of FIGS. 6 and 7.

In addition, the embodiment of FIGS. 6 and 7 has a highly efficient damping capability. This capability is provided by the arrangement and location of the weight supporting pins 54 and the damping springs 52, i.e., the damping springs are located near the inward extremities of the clamp arms 46, and the weight supporting pins are located near outward extremities of the frame arms 44. Such an arrangement and location of pins and springs enhances conductor vibration damping capability by an amount proportional to the distance of the clamp arm between the location of each pin 54 and the location of each spring 52, i.e., a small movement of the conductor end of the clamp arm about pin 54 is developed and multiplied into a large movement of the spring end of the clamp arm such that the force moving the coils of the spring is substantially increased. In this manner, damping of the vibrating conductor is effected very rapidly.

While the invention has been described in terms of preferred embodiments, the claims appended hereto are intended to encompass all embodiments which fall within the spirit of the invention.

Having thus described my invention and certain embodiments thereof, I claim:

1. A conductor vibration damping device comprising a conductor clamping member and a second adjacent member, one of said members having two spaced arms spaced from and located respectively on two opposed sides of an arm of said other member,
  a close wound helical spring and a rigid pin means mechanically connecting said members together, with both of said members directly engaging the pin means and being supported thereby in a manner that allows pivotal movement of at least one of the members about the pin means, and, means spacing the arm of one member from the spaced arms of the other member, the longitudinal axes of the spring and pin means extending between the spaced arms of the one member and through the arm of the other member in a direction substantially perpendicular thereto, and at spaced apart locations therealong.

2. The structure of claim 1 in which the adjacent member comprises a second conductor clamping member.

3. The structure of claim 2 in which the conductor clamping members are laterally offset from each other.

4. The structure of claim 1 in which the adjacent member comprises a rigid frame structure for spacing two or more overhead conductors.

5. The structure of claim 1 in which said spacing means comprises sleeves disposed respectively around the pin means and helical spring to center the arm of the one member between the spaced arms of the other member.

6. The structure of claim 1 in which open wound helical coil springs are located between the arms of the conductor clamping and adjacent members and around the close wound helical spring, said open wound springs allowing resilient motion of the one arm between the two arms.

* * * * *